United States Patent [19]
Koyano et al.

[11] 3,711,716
[45] Jan. 16, 1973

[54] PHOTOELECTRIC SENSOR FOR LINE TRACING AND EDGE TRACING COMPRISING MEANS FOR SWITCHING PHOTOCELL BETWEEN DIFFERENT BRANCHES OF A BRIDGE CIRCUIT

[75] Inventors: Nobushige Koyano, Yokohamashi; Tadashi Hattori, Tokyoto; Yoshimasa Kidowaki, Osaka, all of Japan

[73] Assignees: Iwatani & Co., Ltd., Higashiku, Osaka; Precision Cutting Machine Co., Ltd., Tokyo, Japan

[22] Filed: June 11, 1971

[21] Appl. No.: 152,291

[52] U.S. Cl. ............... 250/202, 250/209, 250/210, 318/577
[51] Int. Cl. ...... G05b 1/00, G06k 11/02, H01j 39/12
[58] Field of Search ....... 250/202, 209, 210; 318/577

[56] References Cited

UNITED STATES PATENTS

| | | | |
|---|---|---|---|
| 2,961,548 | 11/1960 | Prell | 250/210 X |
| 3,135,904 | 6/1964 | Purkhiser | 250/209 X |
| 3,190,159 | 6/1965 | Wilkie et al. | 250/202 X |

*Primary Examiner*—James W. Lawrence
*Assistant Examiner*—T. N. Grigsby
*Attorney*—Arthur Schwartz, Eugene Mar, Joseph Geiger and Peter G. Mack

[57] ABSTRACT

This invention relates to a photoelectric tracing system in which the sensing device can be easily changed from a line tracing type to an edge tracing type and vice versa.

10 Claims, 17 Drawing Figures

INVENTORS
NOBUSHIGE KOYANO
TADASHI HATTORI
YOSHIMASA KIDOWAKI

BY Arthur Schwartz
ATTORNEY

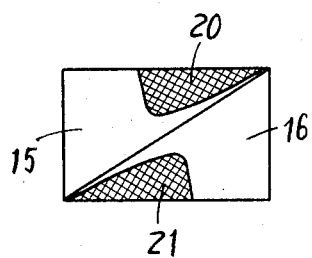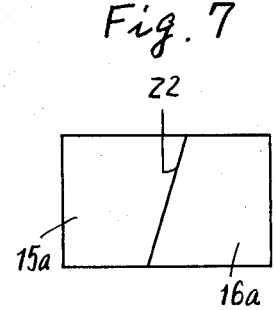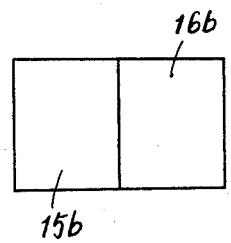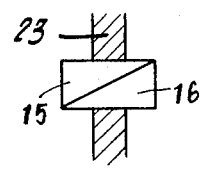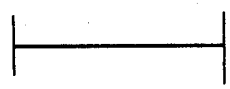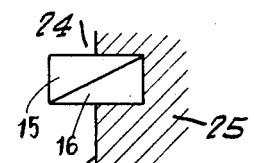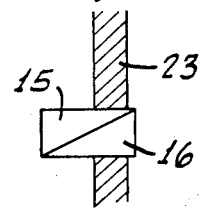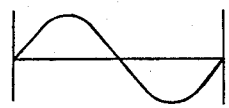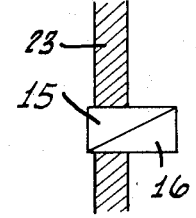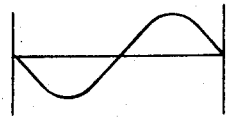

PHOTOELECTRIC SENSOR FOR LINE TRACING AND EDGE TRACING COMPRISING MEANS FOR SWITCHING PHOTOCELL BETWEEN DIFFERENT BRANCHES OF A BRIDGE CIRCUIT

SUMMARY OF THE INVENTION

In this system, a photoelectric sensitive element is composed of a pair of photoelectric elements, which form arms of a Wheatstone bridge together with other resistance elements. The photoelectric elements are connected in different branches of the bridge when the device is used as a line tracer. For edge tracing, the photoelectric elements are connected in the same branch of the bridge, either in a series or a parallel arrangement. The change-over from the edge to the line tracer and vice versa is made by a switch.

BRIEF DESCRIPTION OF THE DRAWINGS

The present invention will be particularly described by way of example, with reference to the accompanying drawings, wherein:

FIGS. 6, 7 and 8 show plan views of photoelectric elements used in each embodiment, FIGS. 9A, 9B and 9C show different stages of the action of photoelectric elements when they are used as a line tracing type, FIGS. 11A, 11B and 11C show different stages of the action of photoelectric elements when they are used as an edge tracing type, and FIGS. 10A, 10B and 10C show different types of output control signals, each corresponding to the action of the photoelectric elements (A), (B) and (C) of FIGS. 9 and 11.

DETAILED DESCRIPTION OF THE INVENTION

Figure 1:
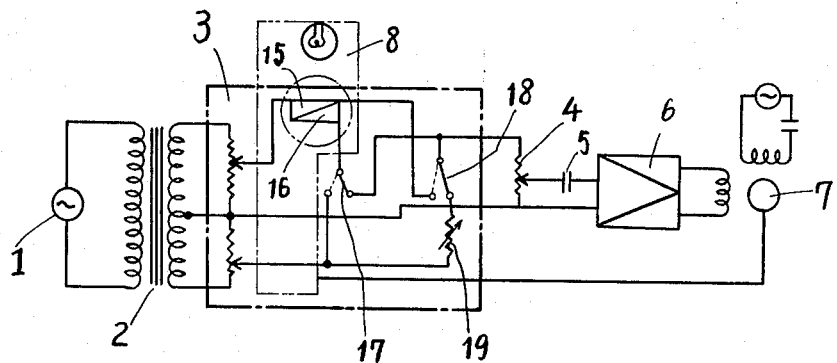
FIG. 1 is an electric circuit of one embodiment according to the present invention being selectable to change from a line tracing type to an edge tracing type.

FIG. 1 is a block diagram of one embodiment of the photoelectric tracing system. In this system, A.C. voltage from a supply source 1 is applied to a sensing bridge 3 through a transformer 2. A control signal from the sensing bridge 3 drives a servo motor 7 through a variable resistance 4, a coupling condenser 5 and a servo amplifier 6. The servo motor 7 controls the position of a scanning head 8 in response to the control signal.

Figure 2:
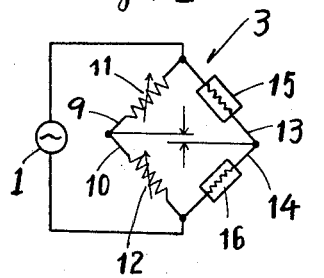
FIG. 2 is a bridge circuit shown in FIG. 1 when a line tracing type is used.

FIG. 2 shows the Wheatstone bridge arrangement used in the line tracing sensor. The sensing bridge 3 contains two variable resistances 11, 12 connected respectively in first branch 9 and a second branch 10 of the bridge, and a pair of photoelectric elements 15, 16 connected respectively to a third branch 13 and a fourth branch 14. The photoelectric elements form part of the scanning head 8.

Figure 3:
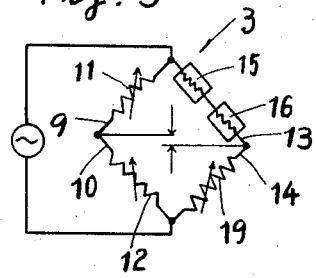
FIG. 3 is another bridge circuit shown in FIG. 1 when an edge tracing type is used.

If a pair of interlocked switches 17, 18 in the sensing bridge 3, shown in FIG. 1, are changed over from their contact points indicated by the solid line to their contact points indicated by the broken line, the bridge circuit diagram is converted from that shown in FIG. 2 to that shown in FIG. 3. In FIG. 3, photoelectric element 16 is connected to the third branch 13 of the bridge in series with photoelectric element 15. Further, a variable resistance 19 is inserted in arm 14 of the bridge and used to balance the photoelectric elements 15, 16. In this configuration the sensing bridge 3 acts as an edge tracing sensor.

Figure 4:
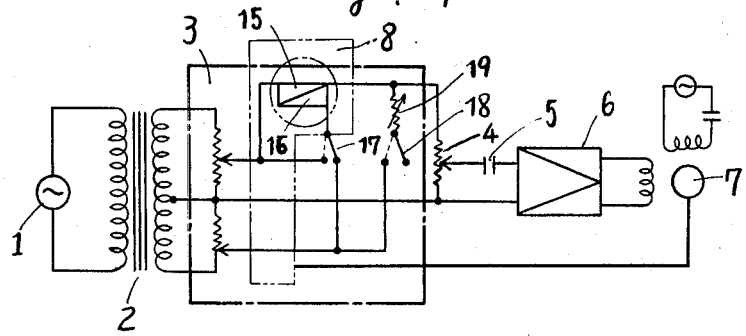
FIG. 4 is an electric circuit of another embodiment according to the present invention.
Figure 5:
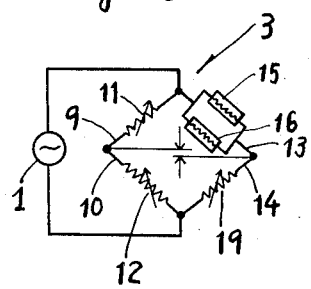
FIG. 5 is a bridge circuit shown in FIG. 4 when an edge tracing type is used.

In an edge tracing type bridge, the photoelectric elements are connected in series as shown in FIGS. 1 and 3, but in another embodiment, they are connected in parallel as shown in FIGS. 4 and 5.

In FIGS. 1 and 4, the photoelectric device is shown as rectangularly shaped comprising two photoelectric elements 15, 16, each of triangular shape. However, photoelectric elements of other configurations or shapes may be combined. FIG. 6 shows two triangular elements which have insensitive sections (shaded) 20, 21 embedded in the sensitive region. By way of further example, FIG. 7 shows two trapezoids 15a, 16a, and FIG. 8 shows two rectangles 15b, 16b.

When this device is used as a line tracing sensor, both photoelectric elements trace a black line 23 drawn across white paper as shown in FIG. 9. When the coupled photoelectric elements are centered above the black line as shown in FIG. 9A, both elements 15 and 16 are well balanced and the output control signal from the sensing bridge is equal to zero as illustrated in FIG. 10A. In this case, the present aligned state is maintained.

In the case where the coupled photoelectric elements deviate to the left as shown in FIG. 9B, both elements 15, 16 lose their balance, and a zero phase shift sinusoidal output signal is generated as shown in FIG. 10B. The control signal to the servo motor 7 causes rotation of the motor in the forward direction and makes both photoelectric elements 15, 16 together with scanning head 8 return to the central, aligned position.

In the case where the coupled photoelectric elements deviate to the right as shown in FIG. 9C, an antiphase sinusoidal wave output signal for control is generated as shown in FIG. 10C. The servo motor 7 rotates in the reverse direction and the position of the scanning head returns to its normal state.

When the device is used as an edge tracing sensor, the coupled photoelectric elements trace a boundary line between a bright region 24 and a dark region 25 as shown in FIG. 11. In the case where the coupled photoelectric elements are centered above the boundary line at their central part as shown in FIG. 11A, the output of the coupled photoelectric elements and the output of the control resistance 19 are well balanced, and the control output is zero, as shown in FIG. 10A.

In the case where the coupled photoelectric elements deviate to the left (to the bright side 24) as shown in FIG. 11B a phase shift output control signal shown in FIG. 10B is generated. In the case where the coupled elements deviate to the right (to the dark side 25) as shown in FIG. 11C, an antiphase output control signal, shown in FIG. 10C, is generated. Thus, the position of both photoelectric elements 15, 16 is always maintained properly.

As mentioned above, the disclosed photoelectric sensing tracer can make a pair of photoelectric elements function effectively not only at the time of line tracing, but also edge tracing, so it can improve its edge tracing accuracy much more than previously available devices.

The invention simplifies line-edge changing operation, because the central line of the coupled photoelectric elements does not change at the time of line-edge changing modes. Thus, no shift operation for repositioning the photoelectric element is needed. Consequently, the tracing device can maintain its accurate tracing ability over a long period of time.

We claim:
1. A photoelectric tracing device comprising:
    a. an electrical bridge circuit having four branches including:
       1. a first resistance in a first branch,
       2. a second resistance in a second branch,
       3. a first photoelectric element in a third branch, and
       4. a second photoelectric element, and means for switching said second photoelectric element back and forth from said fourth branch to said third branch,
    b. a scanning head including said first and second photoelectric elements.
2. A photoelectric tracing device as claimed in claim 1, wherein said resistances are variable.
3. A photoelectric tracing device as claimed in claim 1, wherein said switching means has a third resistance connected thereto whereby said third resistance is connected in the fourth branch when said switching means switches said fourth photoelectric element into said third branch.
4. A photoelectric tracing device as claimed in claim 1, wherein said switching means connects said first and second photoelectric elements in series in one mode and parallel in another mode.
5. A photoelectric tracing device as claimed in claim 1, including a servo means for moving said scanning head in response to variations in output from said bridge circuit.
6. A photoelectric tracing device as claimed in claim 1, wherein said photoelectric elements in said scanning head are triangular shaped.
7. A photoelectric tracing device as claimed in claim 1, wherein said photoelectric elements in said scanning head are trapezoidal shaped.
8. A photoelectric tracing device as claimed in claim 1, wherein said photoelectric elements in said scanning head are rectangularly shaped.
9. A photoelectric tracing device as claimed in claim 6, including photo-insensitive areas therein.
10. A method of scanning lines and edges comprising:
    a. providing an electrical bridge circuit having four branches and containing a pair of photoelectric elements therein,
    b. positioning one of the photoelectric elements in one branch and the other photoelectric element in another branch when tracing a line, and
    c. positioning said other photoelectric element in said one branch with said one photoelectric element when tracing an edge.

* * * * *